United States Patent [19]
Casis et al.

[11] Patent Number: 5,592,633
[45] Date of Patent: Jan. 7, 1997

[54] INTEGRATED CIRCUIT INTERFACE TO CONTROL BUS WITH EITHER OF TWO DIFFERENT PROTOCOL STANDARDS

[75] Inventors: Marco Casis, Varese; Giorgio Pedrazzini, Pavia, both of Italy

[73] Assignee: SGS-Thomson Microelectronics, S.r.l., Agrate Brianza, Italy

[21] Appl. No.: 223,949

[22] Filed: Apr. 6, 1994

[30] Foreign Application Priority Data

Apr. 6, 1993 [EP] European Pat. Off. .............. 93830146

[51] Int. Cl.$^6$ .................................................. G06F 13/00
[52] U.S. Cl. .......................................... 395/309; 395/556
[58] Field of Search ...................................... 395/285, 309, 395/550, 308

[56] References Cited

U.S. PATENT DOCUMENTS 5,404,462  4/1995  Datwyler et al. ...................... 395/308

FOREIGN PATENT DOCUMENTS 225720  11/1986  European Pat. Off. .

OTHER PUBLICATIONS

EDN Electrical Design News, vol. 33, No. 4, Feb. 18, 1988, Newton Massachusetts US, pp. 199–204, Naufel "Serial Techniques Expand Your Options for µC Peripherals"* The whole document *.

Primary Examiner—Thomas M. Heckler
Attorney, Agent, or Firm—Robert Groover; Betty Formby

[57] ABSTRACT

While employing the same number of dedicated pins of an IC, a self-configurable interface circuit between a control bus and the IC recognizes whether the IC is being used in a system employing an SPI or a I2CBUS protocol for the transmission to the IC of control signals through the bus. The interface circuit employs an "inner" SPI interface standard block, to a third input of which either a true CE (chip-enable) signal coming from a third wire of the bus or a virtual CE signal that is self-generated by the interface circuit in case of operation in an I2CBUS environment, is fed. The third (ADDR) pin of the IC may be connected to the CE wire of the bus in case of an SPI application or it may be biased at the supply or ground voltage for selecting one or the other of two internal addresses of the IC, when functioning in an I2CBUS environment.

20 Claims, 5 Drawing Sheets

INTEGRATED CIRCUIT INTERFACE TO CONTROL BUS WITH EITHER OF TWO DIFFERENT PROTOCOL STANDARDS

CROSS-REFERENCE TO RELATED APPLICATION

This application claims priority from European App'n 93830146.2, filed Apr. 6, 1993, which is hereby incorporated by reference.

BACKGROUND AND SUMMARY OF THE INVENTION

The present invention relates to complex signal processing systems in which multiple components are controlled through a serial bus, and to integrated circuits which can be easily assembled into such systems.

In complex signal processing systems, commonly comprising a plurality of integrated circuits (ICs) containing functional signal processing circuits, the practice of controlling the operation of the system by a microprocessor is becoming more and more common. The microprocessor is capable of receiving and carrying out instructions for enabling/disabling certain functions and/or for adjusting certain operating parameters and of transmitting commands to the various integrated circuits for signal processing through a connection bus. Audio signal processing systems in TV receivers, car radios and similar apparatuses, make extensive use of such a microprocessor control system for selecting modes of operation for adjusting balance, tone, volume, etc.

Transmission of different control signals through the bus from the microprocessors to the various integrated circuits of the system takes place according to a certain transmission protocol. The transmission protocols more widely employed for these purposes are the so-called SPI protocol, which has been widely adopted as a standard in the U.S., and the I2CBUS protocol, which is the standard most commonly adopted in European countries:

The SPI standard requires three wires for transmitting to an interface circuit of an integrated device three distinct signals that are commonly referred to by the acronyms: CL (clock), DA (data) and CE (chip-enable). This standard does not require the selection of an address.

By contrast, the I2CBUS standard requires two wires, for transmitting the signals: CL and DA, respectively, plus the selection of an internal address (i.e. an address present within a controlled IC).

Normally, commercial ICs are specifically designated for use with one or the other of these standard protocols.

In either case, the devices are provided with three dedicated pins. In case of ICs destined to be used in an SPI environment, the IC is provided with pins CE, DA and CL. In case of devices destined to operate in an I2CBUS environment, each IC is provided with three dedicated pins, respectively, DA, CL and ADDR. The third pin ADDR of these devices is provided for address selection. Commonly, users of these ICs require the availability within each IC of at least two addresses that may be selected through said third pin ADDR.

Thus there is a burden, in terms of production management by ICs manufacturers, deriving from the necessity of producing specific devices destined to work with one or the other of said two widely adopted transmission protocols for the control data of a supervising microprocessor. There is also a burden on users, such as manufacturers of audio systems, due to the management of different inventories of ICs for producing systems according to one or the other protocol standard.

According to the disclosed innovations, these management burdens and drawbacks may be eliminated by providing ICs with a bus interface circuit for the transmission of commands from a supervising microprocessor to the functional circuit for signal processing integrated in the device, which is capable of automatically adapting itself to one or to the other of two transmission protocol standards without requiring any configuring command. The interface circuit of the instant invention is capable of assessing whether the type of transmission protocol being used differs from a "basic" standard protocol, and consequently, if the incoming control signals are transmitted according to a protocol different from said standard protocol, to simulate an operation according to said "basic" standard protocol.

Such an ability of the interface circuit object of the present invention to self-adapt itself in function of the control signals that are received through three pins of the IC is attained by applying to a third one of said three dedicated pins (for example to the ADDR pin) of the integrated circuit, the signal CE (e.g. by connecting said ADDR pin to a third wire of the transmission bus), in order to permit the functioning of the interface circuit according to an SPI protocol. Alternatively, by maintaining floating or by connecting to a ground potential said third pin ADDR, thus selecting one or the other of two internal addresses, the IC may function according to an I2CBUS protocol.

A correct operation of the interface circuit in either case (and therefore the possibility of employing the same IC in either one or the other environment) is ensured by transmitting either the CE signal that is received through the third pin ADDR in case of an SPI environment or a "virtual" CE signal that is purposely generated by the interface circuit itself in case the IC must be used in an I2CBUS environment, through a multiplexer to an inner interface block, which is substantially an SPI interface circuit.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION

Figure 1:
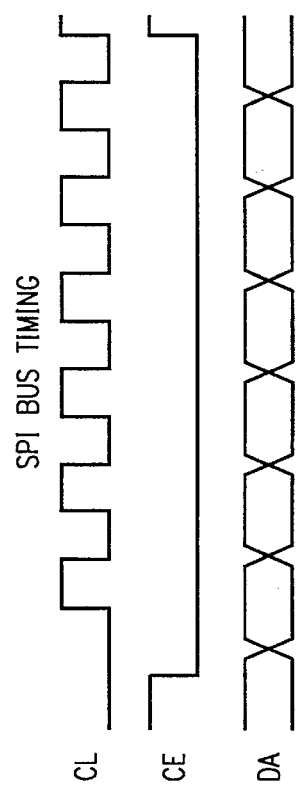
FIG. 1 shows the shape of the three signals: CL, CE and DA, used in an SPI system.
Figure 2:
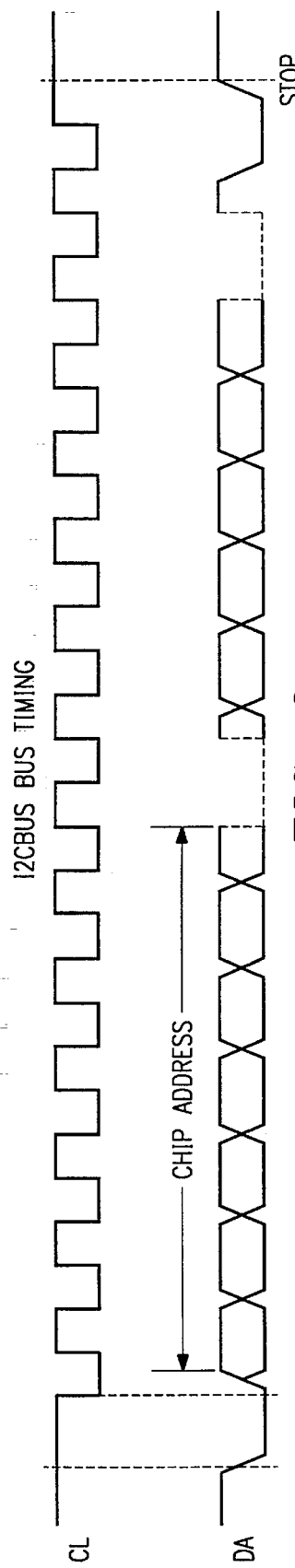
FIG. 2 shows the shape of the two signals CE and DA used in an I2CBUS system.

The numerous innovative teachings of the present application will be described with particular reference to the presently preferred embodiment (by way of example, and not of limitation), in which: FIGS. 1 and 2 make a clear comparison between the different timing signals that are used according to the two different standard protocols, SPI and I2CBUS, respectively. As may be observed, in case of an I2CBUS protocol, the CE signal (chip-enable) is absent while through a third dedicated pin ADDR of the IC, either one or another of two internal addresses of the chip may be selected.

Figure 3:
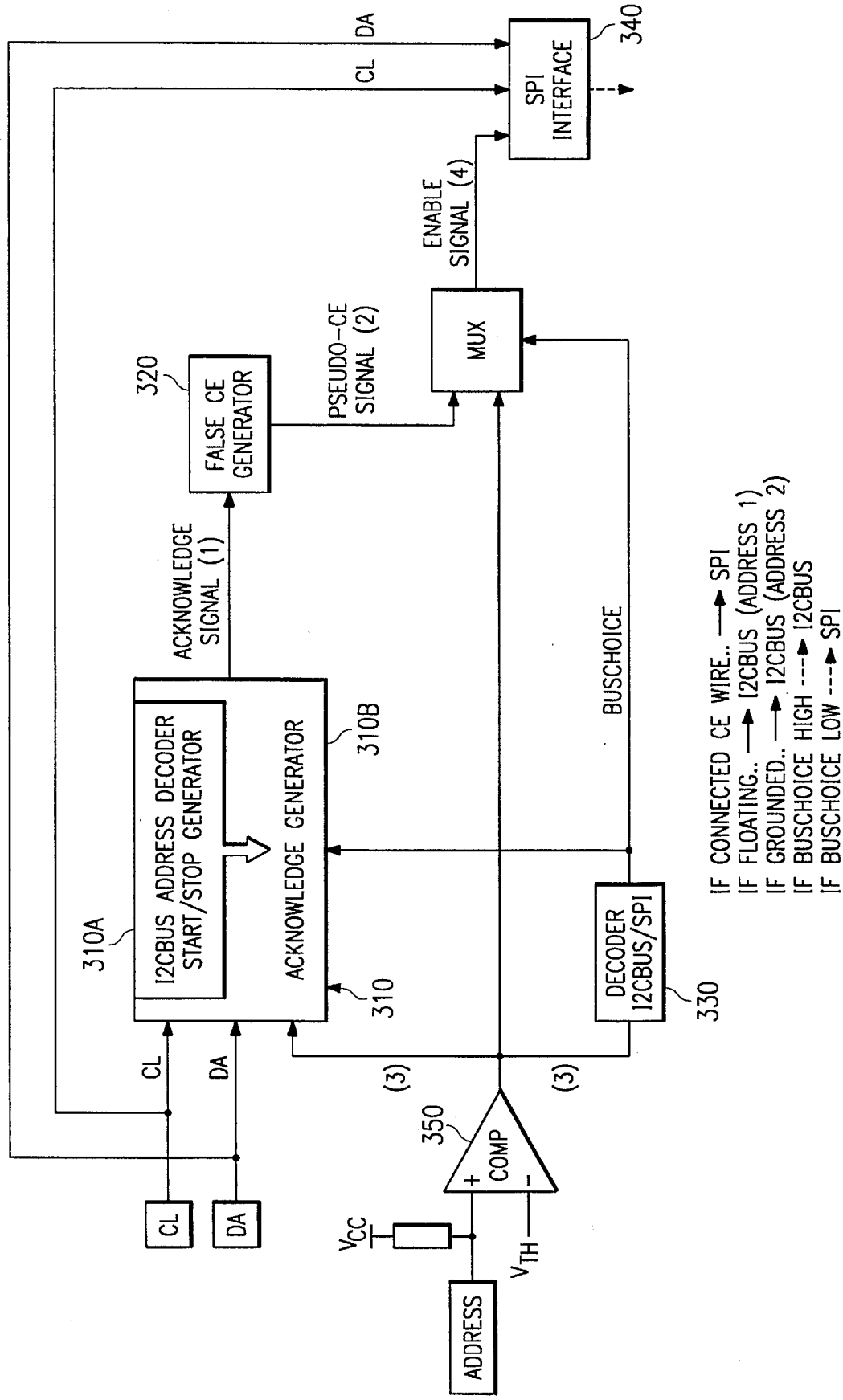
FIG. 3 is a functional block diagram of an interface circuit made according to the present invention.

An interface circuit of the invention is depicted in the block diagram of FIG. 3. An SPI type interface circuit block (SPI interface 340) constitutes an "inner level" of the self-configurable interface circuit of the invention and receives, through three inputs, a clock signal CL, a data signal DA, and an enable signal ((4)). According to the present invention, the enable signal (4) may either be a signal coming from the external bus, i.e. from a third wire of the bus that may be connected to the ADDR pin in case of an SPI application, or a virtual CE signal that is internally generated by the circuit for operation with I2CBUS applications.

The case of an I2CBUS application will be analyzed first. In practice, the signals CL and DA, having the form shown in the diagrams of FIG. 4, will be fed to the dedicated pins CL and DA. The I2CBUS standard is a two-wire serial bus, so in I2CBUS applications the third pin ADDR of the IC does not have to be connected to the control bus. Instead, the ADDR pin may be left floating (disconnected) so as to make the output (3) of the comparator 350 assume a high state ($V_{CC}$) (for example this may represent the selection of a first address). Alternatively, the third pin ADDR may be connected to ground so as to cause the output (3) of the comparator 350 to assume a low state (for example this may represent the selection of a second address). In either address configuration, the output (3) of the comparator 350 that constitutes the input signal for the I2CBUS/SPI decoder block 330 will not undergo transitions, i.e. there will not be any switchings of the signal that is fed to the input of the I2CBUS/SPI decoder, which has the function of detecting the occurrence of a switching of the input signal, by sensing an eventual falling edge. Therefore in either case (with I2CBUS connections), the buschoice signal generated by the I2CBUS/SPI decoder block will have a certain value, for example high.

A high state of the buschoice signal enables the operation of a confirmation signal generating block 310 (including acknowledge generator 310B and start/stop generator 310A). The start/stop generator 310A detects a start signal and a stop signal to decode, after a start signal, the selected address of the IC. If the selected chip address (indicated by output signal (3) of the comparator 350) matches the incoming address detected by start/stop generator 310A, the acknowledge generator generates an acknowledging signal (1) as indicated in the third trace of FIG. 4.

Figure 4:
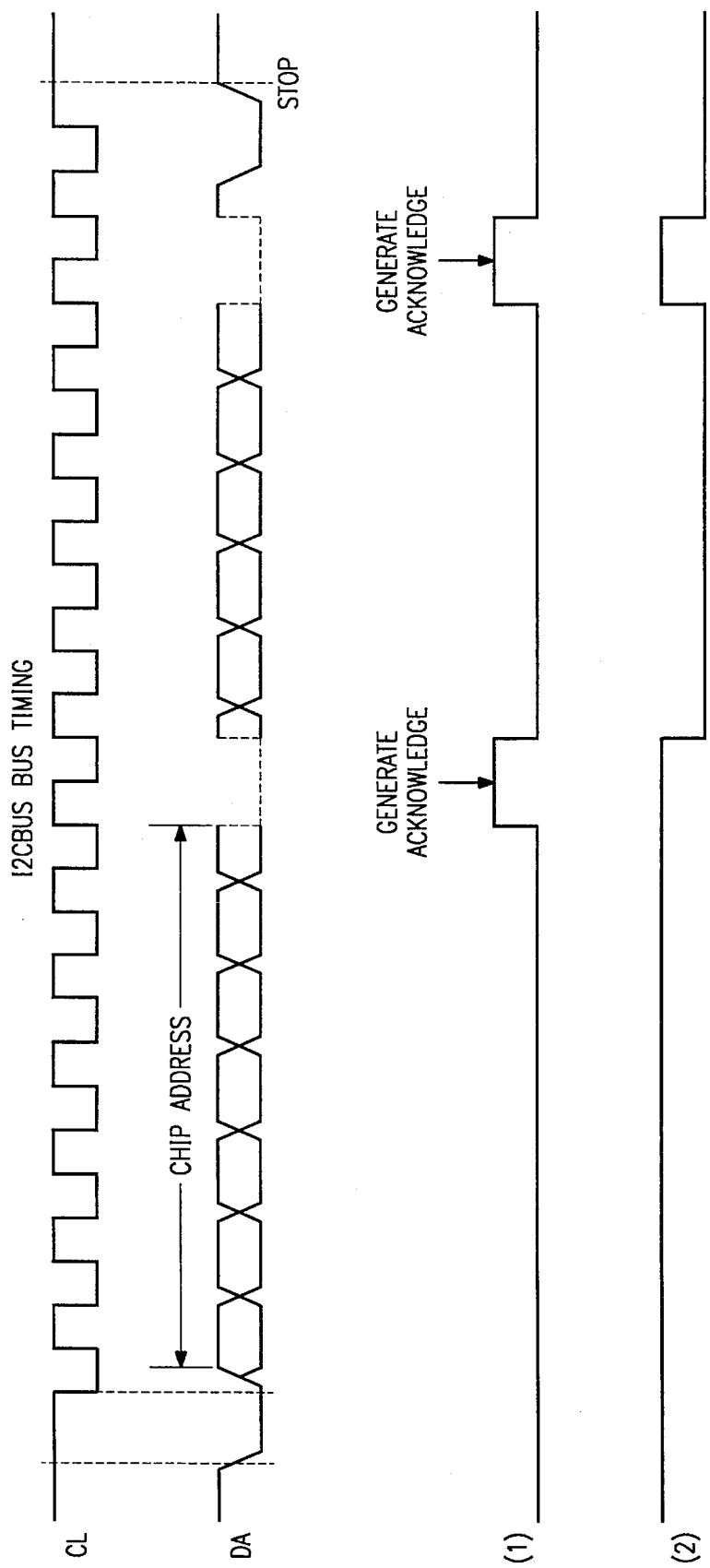
FIG. 4 shows how a pseudo or virtual signal CE is self-generated by the circuit of the invention in case only two signals according to the I2CBUS standard are received.

The acknowledge signal (1) so generated is fed to an input of a circuit 320 (false CE generator) which is capable of generating a virtual CE signal according to the relations shown in FIG. 4. The fourth trace of FIG. 4 (labelled (2)) shows how the false CE generator 320 generates a virtual CE (pseudo-chip-enable) signal (2) by deriving it from the acknowledge signal (1).

Therefore, through a multiplexer MUX controlled by the buschoice signal, the false (virtual) CE signal self-generated by the circuit is fed to the CE input of the "inner", SPI type, interface block 340.

For operation in an SPI mode, a CE signal will be fed to the ADDR pin (connected, in this case, to a third wire of the bus). The CE signal also, at the first transition from high to low or from low to high, will cause a change of state of the buschoice signal produced by the I2CBUS/SPI decoder block 330. The transition of the buschoice signal from high to low disables the operation of the acknowledge generator block 310B. Thus it is no longer necessary to wait for the selection of an address: neither the start and stop signals are interpreted as described above, and the entire top portion of the block diagram of FIG. 3 is effectively inactivated.

The output of comparator 350 essentially tracks the incoming CE signal. The multiplexer MUX, which is enabled by the new state of the buschoice signal, thus permits transmission of the "true" CE signal (contemplated by an operation according to an SPI protocol) from the ADDR pin of the IC to the respective input terminal of the "inner", SPI type interface block (SPI interface).

As may be observed, both in case of operation with an I2CBUS protocol and in case of operation with an SPI protocol, three signals (DA, CL and CE) are eventually fed to the respective inputs of the inner interface block, SPI interface, thus permitting to the interface circuit to function satisfactorily in either an I2CBUS or in an SPI mode.

Figure 5:
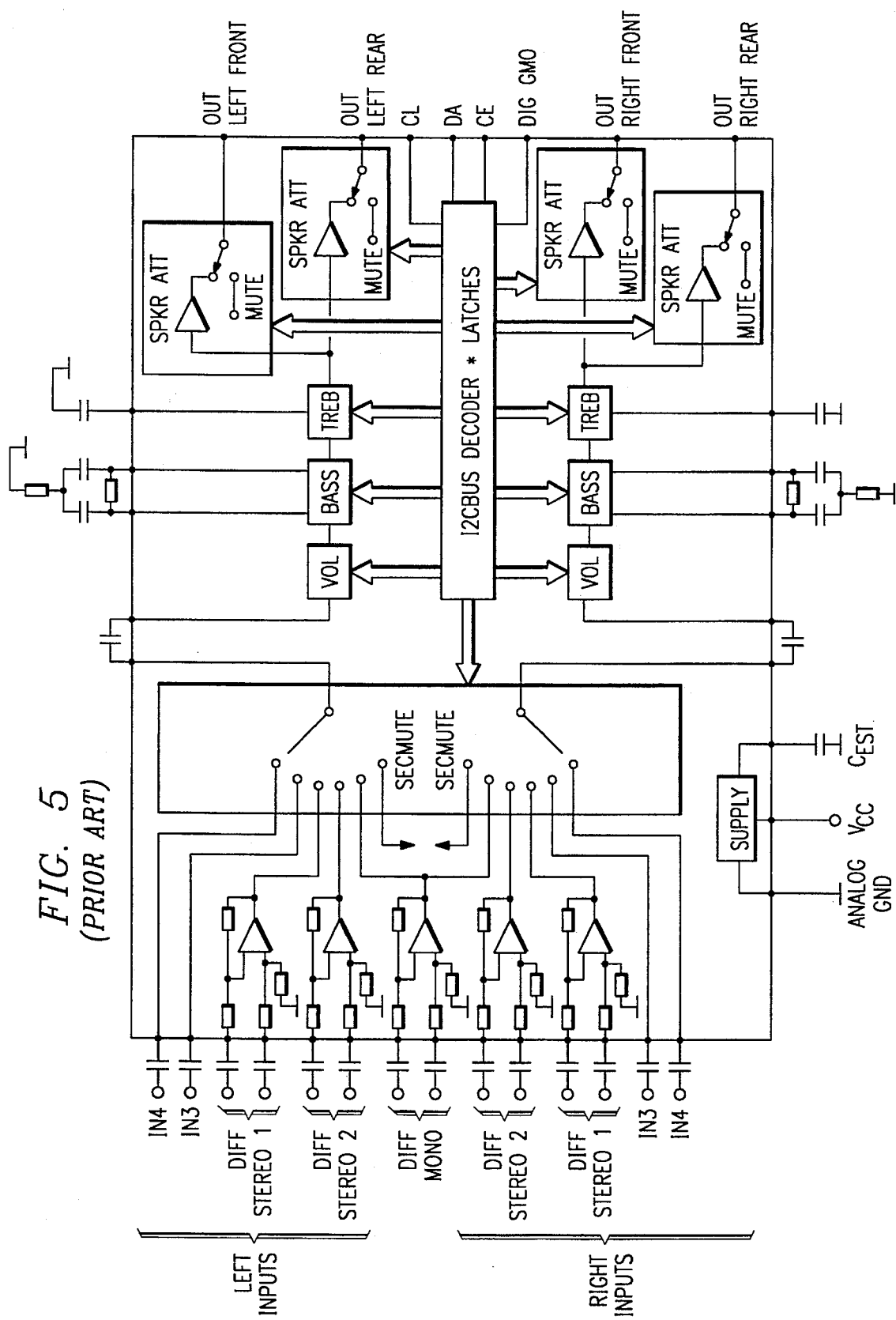
FIGS. 5 and 6 show two present integrated circuits which, using the disclosed innovations, can be combined into a single integrated circuit version.
Figure 6:
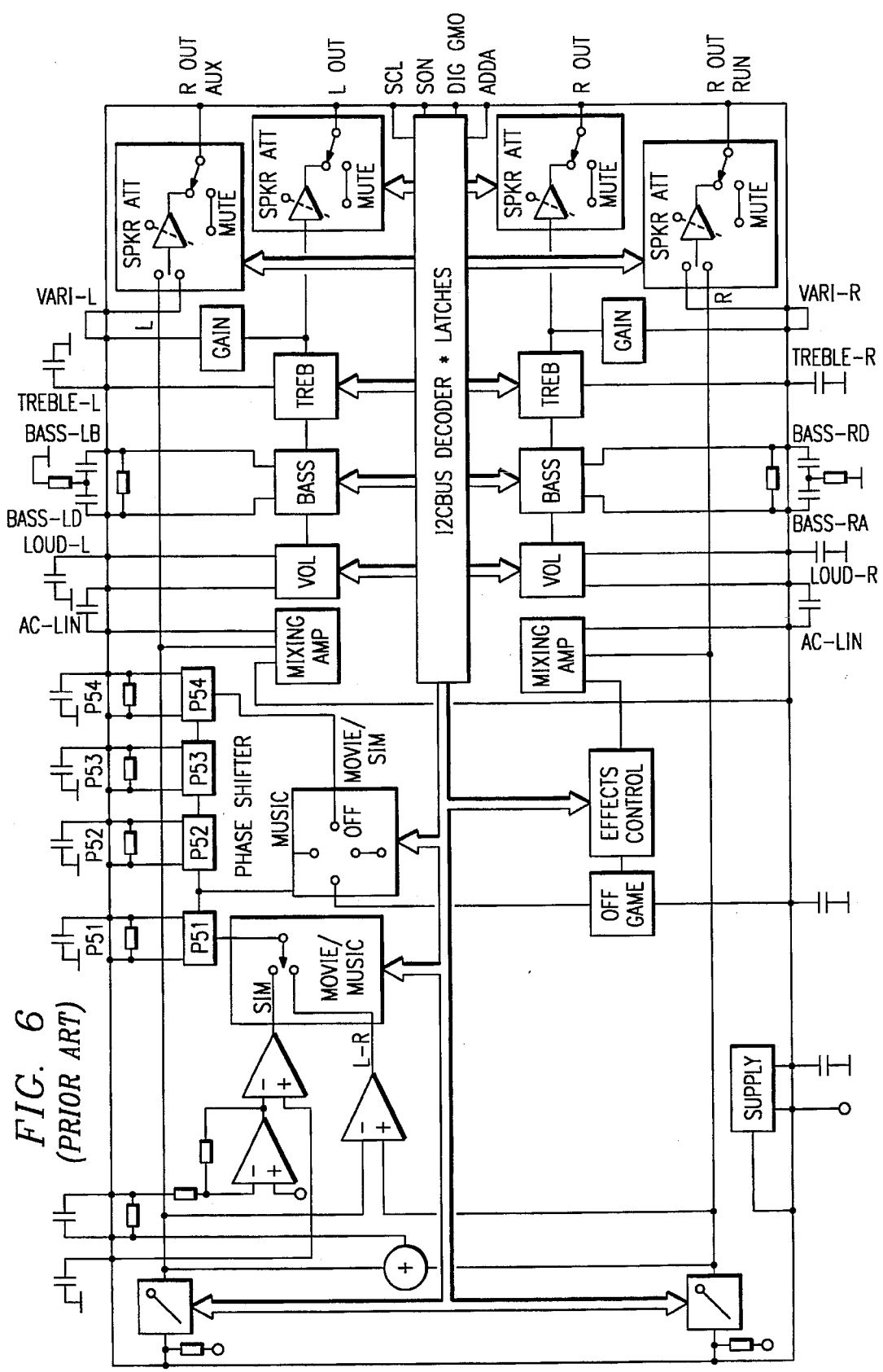

FIGS. 5 and 6 show two present integrated circuit versions which, using the disclosed innovations, can be combined into a single integrated circuit version. Both of these are Serial Bus Controlled Audio Processors; one has a SPI interface, and the other has an I2CBUS interface. Both versions provide a volume, tone (bass and treble) and fader (front/rear) processor for high quality audio applications in car radio and Hi-Fi systems. Control is accomplished by serial bus microprocessor interface. Both are implemented in BiCMOS technology, to provide low distortion, low noise, and DC stepping. Notable features of both chip versions include: input multiplexer, with two stereo differential inputs, two stereo single ended inputs, and one mono differential input; input and output for external equalizer or noise reduction system; volume control in 1.25 dB steps; treble and bass control; four speaker attenuators, with control in 1.25 dB steps for balance and fader facilities, and with independent mute function; all functions programmable through the serial bus interface. The AC signal settings are obtained by resistor networks and switches combined with operational amplifiers.

FIG. 5 shows the TDA7311 Serial Bus Controlled Audio Processor, for an SPI Serial Bus interface. (This chip and its data sheet are both available from SGS-Thomson Microelectronics, and are both hereby incorporated by reference.) The serial bus interface is compatible with SPI bus systems. During the LOW state of the chip enable signal (CE), the data on pin DA is clocked into the shift register at the LOW to HIGH transition of the clock signal CL. At the LOW to HIGH transition of the CE signal the content of the internal sift register is stored into the addressed latches. The transmission is separated into bytes with 6 bit according to the data specification of the audio processor. After every byte a positive slope of the CE signal has to be generated in order to store the data byte. A special clock counter enables the latch of the data byte only, if exactly 8 clocks were present during the LOW state of the CE signal. This results in a high immunity against spikes on the clock line and avoids a storage of wrong data bytes.

FIG. 6 shows the TDA7344 Audio Processor. (This chip and its data sheet are both available from SGS-Thomson Microelectronics, and are both hereby incorporated by reference.) This chip is a volume tone (bass and treble) balance (Left/Right) processor for quality audio applications in car radio and Hi-Fi systems, and also reproduces surround sound by using phase shifters and a signal matrix. Three Surround Modes are Available: Movie, Music and Simulated.

This chip uses the I2CBUS bus. Data transmission from microprocessor to the TDA7344 and conversely takes place through the 2-wires I2CBUS BUS interface, consisting of the two lines SDA and SCL (pull-up resistors to positive supply voltage must be connected).

Thus, according to a disclosed class of innovative embodiments, there is provided: an integrated circuit, comprising: first, second, and third external connections; internal serially interfaced components having data and clock inputs operatively connected to receive signals from the first and second external connections, and also having an enable input; an edge detector which is operatively connected to detect transitions on the third connection, and to provide an output accordingly; an enable signal generation circuit, connected to synthesize enable signals in dependence on data and clock signals received in accordance with a predetermined serial protocol, and in dependence on the state of the output of the edge detector; a multiplexer, connected to provide an output, to the enable input of the internal components, which is selected, in dependence on the state of the output of the edge detector, from either the output of the enable signal generation circuit, or a signal received externally at the third connection.

According to another disclosed class of innovative embodiments, there is provided: an interface circuit between a bus for the transmission of control signals according to a certain protocol chosen between a first standard requiring three wires for the transmission of three signals and a second standard, requiring two wires for the transmission of two signals and the selection of an address through a third pin, and an integrated circuit, the interface circuit comprising at least a first pin connected to a first wire of the bus, a second pin connected to a second wire of the bus and a third pin, an inner interface block capable of functioning according to the first standard and having a first input connected to the first pin, a second input connected to the second pin and a third input through which a third signal is received; decoder means capable of sensing a signal present on the third pin and to modify the state of a selection signal for one or the other of the standard; means for decoding an address and for generating an acknowledgement signal, which can be enabled and disabled by the selection signal and having an input connected to the first pin, a second input connected to the second pin and a third input to which a signal whose state depends from the potential present on the third pin is fed, a state of the selection signal, corresponding to a selection of the second standard, enabling the means to generate an acknowledge signal; a virtual CE signal generator capable of receiving the acknowledgement signal generated by the means and to generate a virtual CE signal; a multiplexer transferring to the third input of the inner interface block a CE signal fed to the third pin of the circuit in case of operation according to the first standard or the generated virtual CE signal in case of operation according to the second standard depending on the state of the selection signal fed to a control input of the multiplexer; the third pin receiving a CE signal through a respective wire of the bus in case of operation according to the first standard of being kept floating or connected to ground potential for selecting either a first or a second address in case of operation according to the second standard.

According to another disclosed class of innovative embodiments, there is provided: a method for interfacing to a control bus, which may correspond to one of plural incompatible standards, from an integrated circuit which has three dedicated pins for interfacing to the control bus, comprising the steps of: connecting first and second ones of the dedicated pins to receive clock and data signals from the control bus; if the control bus uses a first known protocol which uses clock, data, and chip-enable signals, then applying a chip-enable signal from the control bus to a third one of the dedicated pins; if the control bus uses a second known protocol which uses clock and data signals but not chip-enable signals and which requires address-matching, then floating a third one of the dedicated pins to enable operation of the integrated circuit at a first address, or connecting the third dedicated pin to a constant potential to enable operation of the integrated circuit at a second address.

According to another disclosed class of innovative embodiments, there is provided: a method for interfacing to a control bus which may correspond to one of plural incompatible standards, from an integrated circuit which has three dedicated pins for interfacing to the control bus, comprising the steps of: receiving clock and data signals from the control bus on first and second ones of the dedicated pins; determining whether signals received from the control bus on a third one of the dedicated pins are consistent with enable signals of a first known protocol which uses clock, data, and chip-enable signals, and accordingly if signals received on the third dedicated pin are compatible with the enable signals of the first known protocol, then connecting the signals received to an enable input of additional circuitry; if signals received on the third dedicated pin are NOT compatible with the enable signals of the first known protocol, then synthesizing an enable signal in synchrony with signals received on the first and second dedicated pins, and connecting the enable signal to an enable input of additional circuitry, and selectively responding to clock and data signals received on the first and second pins, in dependence on the state of the third dedicated pin, as follows: selectively responding only to data signals which include a first address embedded at a predetermined position therein, if the third dedicated pin is floated, and selectively responding only to data signals which include a second address embedded at the predetermined position therein, if the third dedicated pin is connected to a substantially predetermined potential.

What is claimed is:

1. An integrated circuit, comprising:

first, second, and third external connections;

internal circuitry having data and clock inputs operatively connected to receive respective signals from said first and second external connections, and also having an enable input;

an edge detector which is operatively connected to detect transitions on said third connection, and to provide an output accordingly;

an enable signal generation circuit, connected to said first and second external connections and to said output of said edge detector, to produce an enable signal in dependence on data and clock signals received in accordance with a predetermined serial protocol, and in dependence on the state of said output of said edge detector;

a multiplexer, connected to said output of said edge detector, said enable signal generation circuit and said third external connector to provide an output, to said enable input of said internal circuitry, wherein when said output of said edge detector is in a first state, said multiplexer supplies said enable signal as output, and when said output of said edge detector is in a second state, said multiplexer supplies a signal received externally at said third connection.

2. The integrated circuit of claim 1, wherein said third connection is connected to an enable line of a serial data bus.

3. The integrated circuit of claim 1, wherein said internal circuitry includes audio control circuits.

4. The integrated circuit of claim 1, wherein said internal circuitry includes circuits for independently controlling multiple channels of an audio signal.

5. The integrated circuit of claim 1, wherein said enable signal generation circuit is connected to produce an enable signal, when said third connection is floated, only if signals received on said first and second external connections indicate a first address, and, when said third connection is connected to ground, only if signals received on said first and second external connections indicate a second address.

6. An interface circuit connected between an integrated circuit and a bus for the transmission of control signals according to a certain protocol chosen between a first standard requiring three wires for the transmission of three signals and a second standard, requiring two wires for the transmission of two signals and the selection of an address through a third pin, said interface circuit comprising:
   a first pin connected to a first wire of said bus, a second pin connected to a second wire of said bus and a third pin, wherein when the bus is operated according to said first standard said third pin receives a circuit enable signal through a respective wire of the bus and when the bus is operated according to said second standard, said third pin is either kept floating to indicate the selection of a first address, or connected to ground potential to indicate the selection of a second address;
   an inner interface block capable of functioning according to said first standard and having a first input connected to said first pin, a second input connected to said second pin and a third input through which a third signal is received;
   a decoder which senses a signal present on said third pin and modifies the state of a selection signal for one or the other of said standards;
   circuitry for decoding an address and for generating an acknowledgement signal, said circuitry being connected to receive said selection signal and further having an input connected to said first pin, a second input connected to said second pin and a third input; wherein when a state of said selection signal corresponds to a selection of said second standard, said circuitry generates said acknowledgement signal;
   a circuit enable signal generator which generates a circuit enable signal when said acknowledgement signal is received;
   a multiplexer, wherein when said selection signal is in a first state, said multiplexer transfers to said third input of said inner interface block a circuit enable signal fed to said third pin of the circuit and when said selection signal is in a second state, said multiplexer transfers said generated circuit enable signal.

7. An interface circuit as defined in claim 6, wherein said third pin is connected to a noninverting input of a comparator and through an impedance to a supply node, the output of the comparator being connected to an input of said decoder to an input of said multiplexer and to an input of said circuitry for decoding an address and generating an acknowledgement signal.

8. An interface circuit as defined in claim 6, wherein said third pin is operatively connected to an input of a comparator; and wherein an output of said comparator is connected to said multiplexer, and to said decoder, and to said circuitry for generating an acknowledgement signal.

9. A method for interfacing to a control bus, which may correspond to one of plural incompatible standards, from an integrated circuit which has three dedicated pins for interfacing to the control bus, comprising the steps of:
   (a.) connecting first and second ones of said dedicated pins to receive clock and data signals from the control bus;
   (b.) if the control bus uses a first known protocol which uses clock, data, and chip-enable signals, then applying a chip-enable line of the control bus to a third one of said dedicated pins;
   (c.) if the control bus uses a second known protocol which uses clock and data signals but not chip-enable signals and which requires address-matching, then
      floating a third one of said dedicated pins to indicate that a first address should be used, or
      connecting said third dedicated pin to a constant potential to indicate that a second address should be used.

10. The method of claim 9, wherein said first known protocol is the SPI protocol.

11. The method of claim 9, wherein said second known protocol is the I2CBUS protocol.

12. The method of claim 9, wherein said first known protocol is the SPI protocol, and said second known protocol is the I2CBUS protocol.

13. A method for interfacing to a control bus, which may correspond to one of plural incompatible standards, from an integrated circuit, which has three dedicated pins for interfacing to the control bus, comprising the steps of:
   receiving clock and data signals from the control bus on first and second ones of said dedicated pins;
   determining whether signals received from the control bus on a third one of said dedicated pins are consistent with enable signals of a first known protocol which uses clock, data, and chip-enable signals, and accordingly
      (a.) if signals received on said third dedicated pin are compatible with the enable signals of said first known protocol, then connecting said signals received to an enable input of said integrated circuit;
      (b.) if signals received on said third dedicated pin are NOT compatible with the enable signals of said first known protocol, then
         synthesizing an enable signal in synchrony with signals received on said first and second dedicated pins, and connecting said enable signal to an enable input of said intergrated circuit, and
         selectively responding to clock and data signals received on said first and second pins, in dependence on the state of said third dedicated pin, as follows:
            selectively responding only to data signals which include a first address embedded at a predetermined position therein, if said third dedicated pin is floated, and
            selectively responding only to data signals which include a second address embedded at said predetermined position therein, if said third dedicated pin is connected to a substantially predetermined potential.

14. The method of claim 13, wherein said first known protocol is the SPI protocol.

15. The method of claim 13, wherein said first known protocol is the SPI protocol, and said second known protocol is the I2CBUS protocol.

16. The method of claim 13, wherein said second known protocol is the I2CBUS protocol.

17. The method of claim 13, wherein said integrated circuit includes audio control circuitry.

18. The method of claim 13, wherein said integrated circuit includes circuits for independently controlling multiple channels of an audio signal.

19. The method of claim 13, wherein said steps of connecting an enable input are performed by a multiplexer.

20. The method of claim 13, wherein said step of determining whether signals received on said third dedicated pin are consistent with said first protocol is performed using a comparator which has an input operatively connected to said third dedicated pin.

* * * * *